United States Patent [19]

Lu

[11] Patent Number: 5,664,426
[45] Date of Patent: Sep. 9, 1997

[54] REGENERATIVE GAS DEHYDRATOR

[75] Inventor: Yingzhong Lu, Oak Ridge, Tenn.

[73] Assignee: PAI, Oak Ridge, Tenn.

[21] Appl. No.: 599,292

[22] Filed: Feb. 9, 1996

[51] Int. Cl.[6] .................................. F25D 17/06
[52] U.S. Cl. ...................... 62/93; 62/637; 165/921; 165/DIG. 212; 55/269; 55/DIG. 17
[58] Field of Search .................... 62/93, 96, 98, 62/272, 277, 637; 165/144, 913, 921, DIG. 202, DIG. 204, DIG. 212; 34/284, 285, 298; 55/267, 268, 269, 385.1, 467, DIG. 15, DIG. 17

[56] References Cited

U.S. PATENT DOCUMENTS

| | | | |
|---|---|---|---|
| 2,475,255 | 7/1949 | Rollman et al. | 62/170 |
| 2,689,875 | 9/1954 | Hachmuth et al. | |
| 2,958,203 | 11/1960 | Trepp | 62/637 |
| 3,157,480 | 11/1964 | Van Beukering | 62/637 |
| 4,242,877 | 1/1981 | Geerkins | 62/93 |
| 4,407,137 | 10/1983 | Hayes, Jr. | 62/80 |
| 4,991,408 | 2/1991 | Liszka | 62/401 |
| 5,107,919 | 4/1992 | Basseen et al. | 165/47 |
| 5,428,963 | 7/1995 | Korycki et al. | 62/93 |

OTHER PUBLICATIONS

"The Role of Eddy Diffusion in Mass Transfer Between Phases" By: T. K. Sherwood and B. B. Woertz Published By: American Institute of Chemical Engineers Containing papers read at Philadelphia, Pa Nov. 9, 10, 11, 1938, etc.

*Primary Examiner*—William Doerrler
*Attorney, Agent, or Firm*—Luedeka, Neely & Graham, P.C.

[57] ABSTRACT

The invention disclosed herein relates to a dehydrator for removing moisture from a gas. The dehydrator has a narrow elongate conduit having an equivalent hydraulic diameter which facilitates the diffusion of water molecules through the gas to a cooled gas contact surface of the conduit. Despite the use of narrow elongate gas flow path, the dehydration efficiency of the apparatus of the invention is outstanding and pluggage of the gas flow path is substantially eliminated.

28 Claims, 7 Drawing Sheets

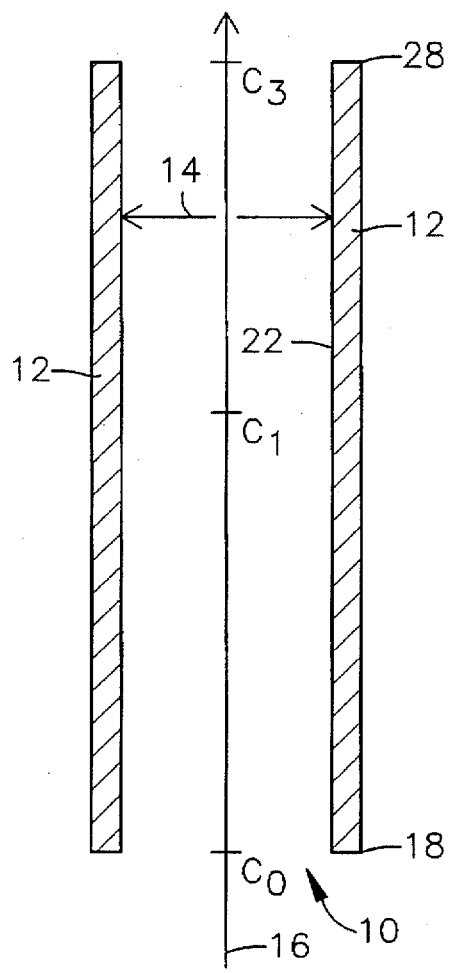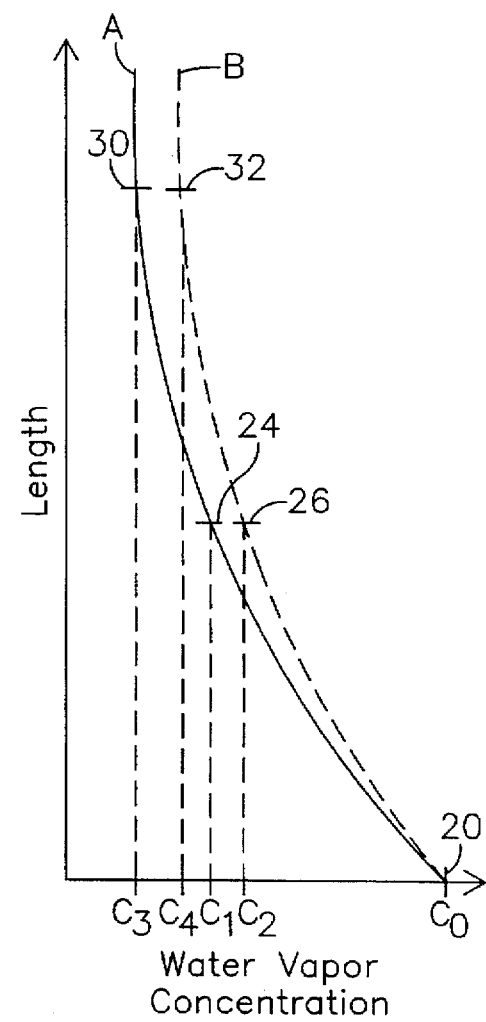
*Fig.* 1A
*Fig.* 1B

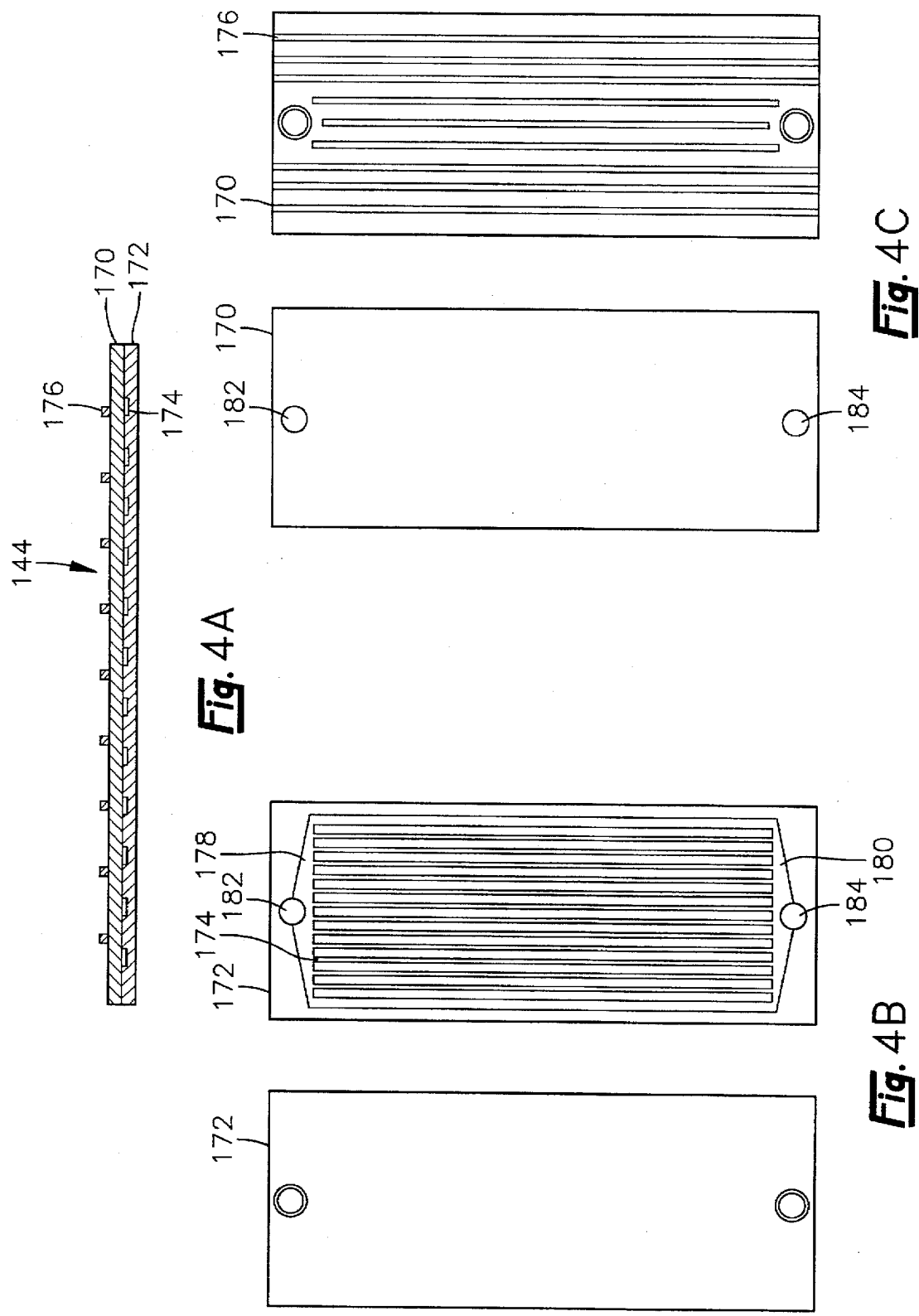

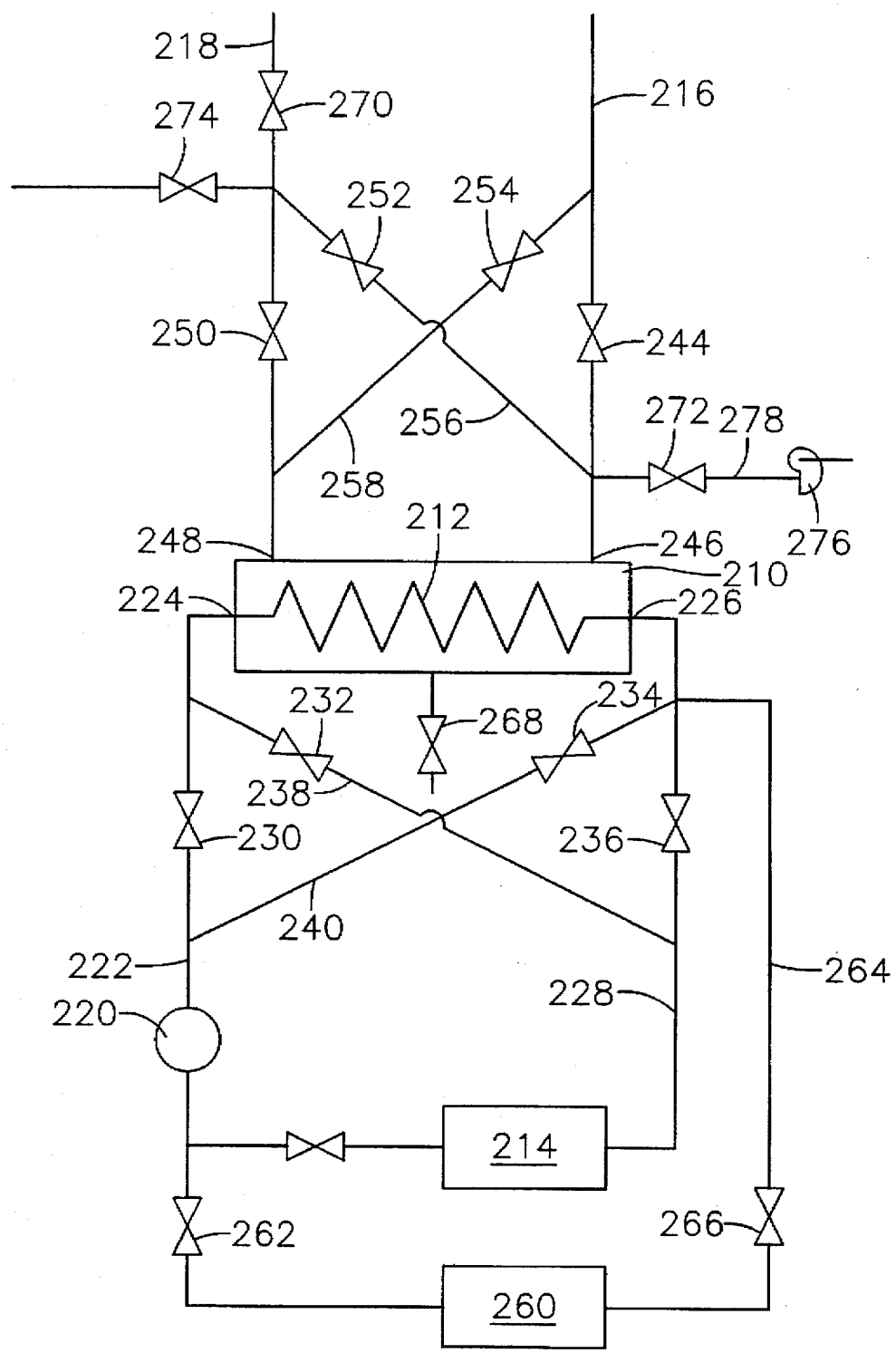
*Fig.* 6

REGENERATIVE GAS DEHYDRATOR

This invention relates to an apparatus and method for removing moisture from gas streams, particularly natural gas and compressed air streams, with improved economics and efficiency.

BACKGROUND OF THE INVENTION

Natural gas production and consumption will continue to expand in the foreseeable future in the United States and throughout the world. However, the processing and delivery of natural gas is complicated by the fact that the material is typically saturated with water vapor when extracted from underground sources. Accordingly, natural gas must be dehydrated before it enters the delivery pipeline.

Among the known natural gas dehydration methods, the glycol absorption process has gained wide acceptance because of its effectiveness, reliability, and relatively low cost. However, recent concern about the environmental impact from the release of benzene and other toxic hydrocarbons to the atmosphere as a result of the use of the glycol absorption process militates against the expansion of the use of the glycol dehydration process.

A less environmentally hazardous process for the dehydration of gaseous materials involves the use of membrane separation techniques. However, membrane separation processes are generally only competitive for processing sub-quality natural gas to remove other undesirable gaseous components along with the water vapor due to the inherent loss of natural gas in the process and its higher cost.

Another dehydration method includes the use of a desiccant or molecular sieve material to absorb the water vapor and thus dry the gaseous material. Once the absorption efficiency of the desiccant or molecular sieve material decreases to a set limit, the material is either replaced or regenerated, typically with heat to remove the water. While such systems are mostly suitable for compressed air and non-flammable gaseous materials, dehydration of natural gas using such a system is more difficult and often hazardous. Natural gas may contain entrained organic liquids which may deposit on the desiccant or molecular sieve material. Accordingly, handling or disposing of the used desiccant containing flammable hydrocarbons is a safety concern and should be addressed in a suitable manner.

Refrigeration processes have also been used to reduce the water vapor content of gaseous materials. In the commercially practiced refrigeration processes, the entire gaseous stream is cooled and the water vapor is deposited as condensate and/or as ice on the cold surfaces of the refrigeration system. A problem with existing refrigeration processes is that the ice tends to build up and plug the flow areas of the system. A portion of the ice and hydrates of the gaseous material may also be entrained in the gas stream and must be separated upon exit from the system. Hence, the principal difficulty associated with refrigeration processes is the accumulation and removal of solid deposits from the tubes and removal of hydrates and entrained solids from the gas exiting the refrigeration system. Furthermore, the thermal efficiency of a refrigeration process is often low because the entire gaseous material must be cooled and because the accumulation of deposits on the cold surfaces impair the heat transfer efficiency of the system. As a result, the equipment for refrigeration processes is bulky and often requires the use of two identical units which are operated alternatively in order to melt ice deposits. Because of the problems and limitations associated with currently available refrigeration systems, these processes have failed to gain wide acceptance for use in dehydrating natural gas.

An attempt to improve the refrigeration process is described in U.S. Pat. No. 2,475,255 to W. F. Rollman. In his process, Rollman uses fluidized chilled granular materials to cool a gas, freeze the moisture, and abrade the ice deposited on the chilled wall surfaces of a refrigeration system. Ice particles which are entrained in the exiting gaseous stream from the refrigeration system are separated by use of a cyclone. The system described by Rollman is quite complicated and cumbersome to start up and operate due to the need to maintain a fluidized stream of solid inert particles and ice at all times during the dehydration sequence. Abrasion and/or erosion of the cooling surfaces may also be a problem with the system described in the '255 patent due to the movement of the solid inert particles and ice through the system.

Accordingly, it is an object of the present invention to provide an apparatus and process for dehydrating a gaseous material.

Another object of the invention is to provide a dehydration system which is environmentally friendly.

A further object of the invention is to provide an apparatus and method for dehydrating a gaseous stream while reducing the amount of entrained solids and/or hydrated gases in the dehydrated stream exiting the apparatus.

Another object of the invention is to provide a simple, efficient, easy to maintain system for dehydrating gases which uses readily available materials.

Still another object of the invention is to provide a system for dehydrating gases which is adaptable for dehydrating a wide variety of gaseous materials.

SUMMARY OF THE INVENTION

With regard to the above and other objects, the present invention provides a dehydrator for a moisture-laden gas which comprises an elongate conduit having an entrance open end and an exit open end and a gas contact surface so at to define a flow path for the gas through the conduit from the entrance open end to the exit open end. The conduit has an equivalent hydraulic diameter which promotes the diffusion of water molecules through the gas to adjacent the gas contact surface of the conduit. The dehydrator also comprises a means for cooling the gas contact surface to a temperature sufficient to freeze water molecules adjacent the gas contact surface so that ice is deposited on the gas contact surface along the gas flow path through the conduit. During operation of the dehydrator, water vapor is removed from the gas so that the gas exiting the dehydrator is unsaturated.

The "equivalent hydraulic diameter", as used herein is defined by the following equation:

$$D_e = 4A/S \qquad (1)$$

wherein $D_e$ = equivalent hydraulic diameter in centimeters;

A = cross-sectional area of the conduit in square centimeters; and

S = the wettable perimeter of the conduit in centimeters.

According to equation (1), the equivalent hydraulic diameter may be provided by a rectangular conduit having a height many times greater than the width so that the cross-sectional area of the conduit is equivalent to the cross-sectional area of a circular conduit of diameter D. The equivalent hydraulic diameter sets the total length of the flow path required for a certain desired moisture reduction amount.

The present invention is a substantial improvement over previous refrigeration-based dehydration processes and is based on an entirely different working principle. While refrigeration processes are often based entirely on heat transfer (i.e., the cooling down of the bulk gas stream to the temperature of the required freezing point or dew point of the water vapor in the gaseous material), the apparatus and methods of the present invention rely on mass transfer of water molecules to a chilled surface (i.e., the moisture diffusing to and depositing on the chilled surface) while the temperature of the bulk gas stream mass remain substantially above the dew point of the remaining water vapor in the gas.

Contrary to the conventional wisdom that a relative large gas flow channel is necessary to avoid pluggage of the channel with ice, the apparatus and method of the present invention employs elongate conduits having relatively narrow gas flow passages. The gas flow conduit has an equivalent hydraulic diameter which promotes the diffusion of water molecules through the gas to the gas contact surface of the conduit. While not desiring to be bound by theoretical considerations, it is believed that eddy diffusion under turbulent gas flow conditions causes the water molecules to move rapidly to adjacent the chilled surface of the conduit where the water molecules freeze. The eddy diffusivity of a gas is directly proportional to the Reynolds number whereas the heat transfer coefficient is proportional to the Reynolds number to the 0.8 power. Accordingly, for increasing Reynolds numbers, the mass transfer rate increases faster than the heat transfer rate. As a result, the temperature of the bulk of the gas remains above the dew point of the residual water vapor in the gas while water molecules diffuse to the surface of the conduit and are removed. Since it is not necessary to cool the bulk gas stream to the saturation point in order to reduce the moisture content of the gas, the flowing gas stream may also serve to reduce ice formation at the entrance of the elongate conduit as well as along the gas flow path through the conduit. Thus, despite the relative narrowness of the gas flow conduit, the apparatus of the present invention is less prone to ice pluggage. Furthermore, because the bulk of the gas stream is always above the dew point and freezing point of the residual water vapor in the gas, gas hydrates and entrainment of ice in the gaseous stream are also reduced or avoided entirely. Accordingly, there is no need for the use of an entrainment separator at the exit of the dehydrator.

Also, the dehydrator of the present invention is an environmentally benign device as compared to other methods for moisture removal such as the glycol absorption process. Only liquid water is discharged from the dehydrator. Hence, there is little, if any, discharge of hazardous or toxic vapors from the dehydrator to the atmosphere.

In another aspect, the present invention provides a method for removing moisture from a gas containing water vapor. The method comprises establishing a turbulent flow of gas through an elongate conduit having a gas contact surface which is cooled to a temperature below the freezing point of the moisture in the gas. The conduit has an entrance open end and an exit open end for flowing the gas from the entrance open end to the exit open end. As the gas flows through the conduit under turbulent gas flow conditions, water vapor diffuses to adjacent the gas contact surface, the water vapor freezes on the surface and is removed from the gas while the temperature of the bulk gas streams remains substantially above the freezing point of the residual moisture in the gas. The gas leaving the conduit from the exit end has a residual moisture level which is substantially below the saturation point of the gas.

BRIEF DESCRIPTION OF THE DRAWINGS

The above and other features and advantages of the present invention will now be further described in the following detailed description in conjunction with the attached drawings in which:

FIGS. 1A and 1B illustrate the change in moisture concentration of a gas stream as it moves through an elongate conduit according to the method of the invention;

FIGS. 4A through 4C are illustrations of the design of the heat transfer elements of the multi-channel dehydrator of FIG. 3;

FIG. 6 is a schematic representation of a dehydrator and associated regeneration system according to the invention.

DETAILED DESCRIPTION OF THE INVENTION

Figure 2:
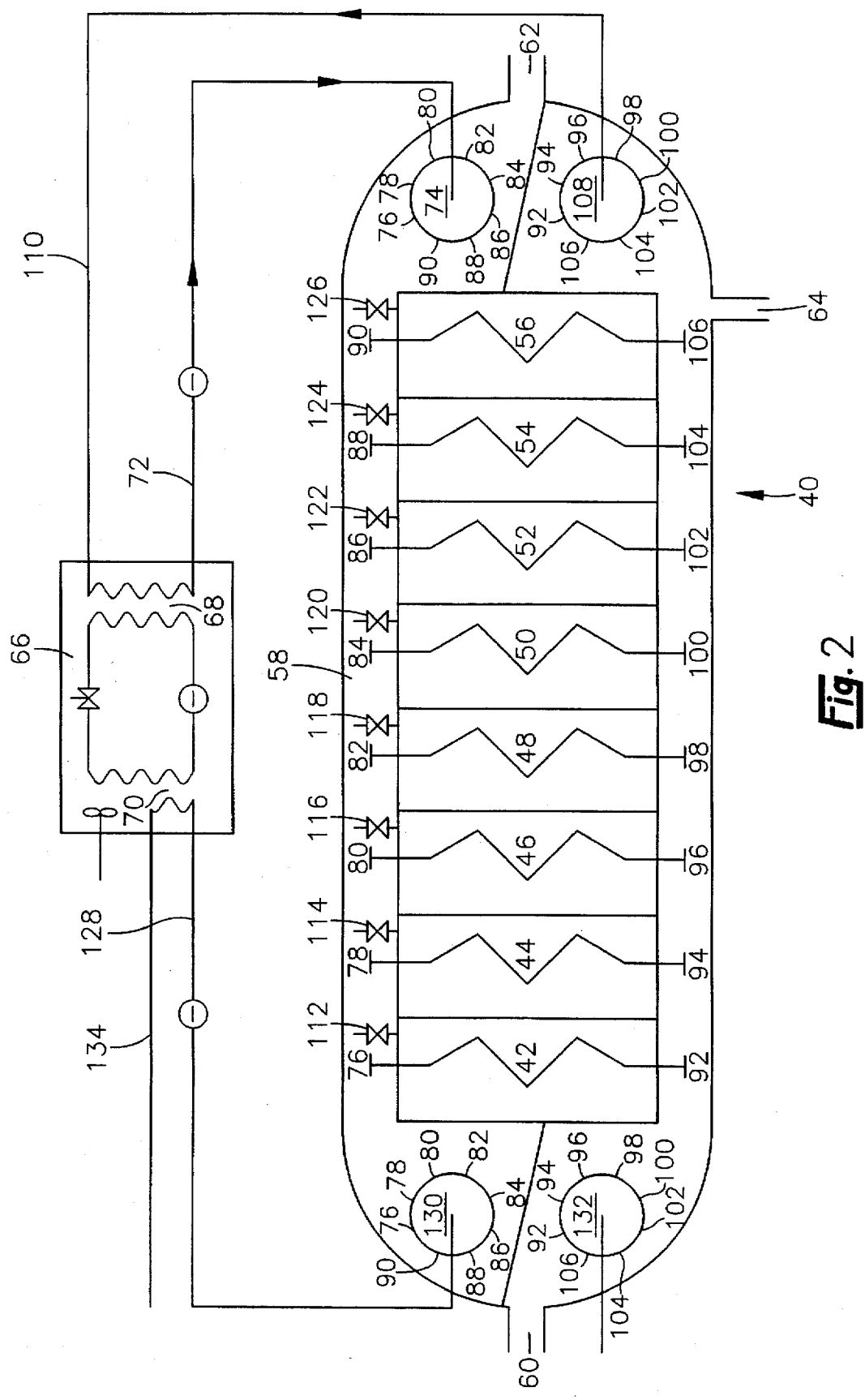
FIG. 2 is a schematic representation of a dehydrator in accordance with one embodiment of the invention.

With initial reference to FIGS. 1A and 1B, a change in the concentration of the water vapor in the gas stream along the length of an elongate conduit according to the invention is illustrated. As shown in FIG. 1A, an elongate conduit 10 includes chilled wall surfaces 12 having an equivalent hydraulic diameter 14. A gas stream 16 containing water vapor flows through the conduit with a flow rate in the turbulent flow regime.

As the gas stream 16 flows through the conduit 10, a portion of the water vapor in the gas is removed from the gas stream thereby decreasing the water vapor concentration of the gas. The decrease in water vapor concentration of the gas stream along the length of the conduit 12 is illustrated graphically in FIG. 1B as curve A. At the entrance 18 of the conduit, the water vapor concentration in the gas is represented by point 20 in FIG. 1B. At point 20 corresponding to the initial concentration $c_0$, the gas may be saturated with water vapor. As the gas stream moves through the conduit, water vapor is removed from the gas so that at point 22 along the conduit in FIG. 1A, the water vapor concentration $c_1$ of the gas corresponds to point 24 on curve A in FIG. 1B which is less than the saturation concentration $c_2$ of the gas corresponding to point 26 on curve B (FIG. 1B). At the exit 28 of the conduit (FIG. 1A), the gas stream 16 has a water vapor concentration $c_3$ corresponding to point 30 (FIG. 1B) while the saturation concentration $c_4$ of the gas corresponds to point 32 on curve B in FIG. 1B. Thus the gas exiting the conduit has a water vapor concentration which is significantly less than the saturation concentration of the gas.

An important feature of the invention is the establishment of a turbulent flow of the gas in an elongate conduit. By "elongate conduit" it is meant any fluid flow path provided by a tubular, concentric tubular, rectangular or wound helical or other confining structure, wherein the width or diameter transverse to the direction of fluid flow is less then the length of the flow path. It is preferred that the gas flow through the conduit with a Reynolds number within the range of from about 4,000 to about 300,000 or higher. Accordingly, for a natural gas stream, the cross-sectional flow area or equivalent hydraulic diameter should be small, preferably less than about ½ inch, and most preferably ranging from about 1/20 to about ½ inch (about 0.1 to about 1.3 centimeters).

The Reynolds number for the conduit is defined by the following equation:

$$R_e = D_e V \rho / \mu \qquad (2)$$

wherein $R_e$=Reynolds number (dimensionless);

V=velocity of the gas in centimeters per second;

ρ=density of the gas in grams per cubic centimeter; and

μ=viscosity of the gas in grams per centimeter-second.

As the gas flows through the elongate conduit as described above by reference to FIGS. 1A and 1B, the concentration c of water vapor in the gas stream decreases as a result of diffusion of the water vapor to the chilled surface of the conduit. The eddy diffusion process which results in a decrease in the water vapor content of the gas may be described by the following partial differential equation:

$$V \partial c/\partial y = E \partial^2 c/\partial x^2, \quad (3)$$

wherein c=concentration of water vapor in gram-moles/cm$^3$, y=distance in the direction of the gas flow in cm;

x=transverse distance measured from the center line of the flow channel in cm; and E=eddy diffusivity of the water vapor in turbulent flow in cm$^2$/sec.

The approximate solution of this equation is expressed in the following form:

$$c = c_0 \exp\{-[(E/V)(\pi/x_0)^2]L\} \cos (\pi/x_0)x, \quad (4)$$

wherein $x_0$=the extrapolated channel width at which c=0 and L is the total length in centimeters of the flow path with the other symbols being the same as above.

Equation 4 describes the water vapor concentration distribution along and transverse to the gas flow path. The distribution along the flow path is an inverse exponential function, $\exp\{-[(E/V)(\pi/x_0)^2]L\}$, and the distribution transverse to the flow path is a cosine function, $\cos (\pi/x_0)x$.

The length of the flow path, L, required for reducing the water vapor concentration of the gas to a desired value at the exit of the elongate conduit may be calculated as:

$$L = (V/E)(x_0/\pi)^2 \ln c_0/c_L, \quad (5)$$

where $c_0$ is the water vapor concentration of the gas at the entrance of the elongate conduit and $c_L$ is the water vapor concentration of the gas at the exit of the elongate conduit. From equation 5, the length L, of the elongate conduit required for reducing the water vapor concentration of the gas from $c_0$ to $c_L$ may be determined for a selected equivalent hydraulic diameter.

As illustrated by the foregoing equations, the water vapor concentration, $c_L$, exiting the elongate conduit depends on the temperature of the chilled surfaces of the conduit rather than on the temperature of the bulk gas stream. The temperature of the chilled surfaces of the conduit may be controlled by the coolant inlet temperature and its flow rate. As an example, when the coolant inlet temperature is $-15°$ C. ($5°$ F.) and the temperature gradient across the heat transfer surface is $-8.3°$ C. ($15°$ F.), the temperature of the chilled surface of the conduit is $-6.7°$ C. ($20°$ F.). The corresponding water vapor pressure at the surface is 2.057 mm Hg. According to these calculations, under eddy diffusion conditions, the equilibrium water vapor pressure within the bulk gas stream is approximately triple the water vapor pressure of the gas in the boundary layer adjacent the chilled surface. The difference in vapor pressure causes the water vapor in the bulk gas stream to diffuse to the boundary layer which has a lower vapor pressure. As a result, the corresponding average water vapor concentration in the gas exiting the dehydrator may be less than 6 lb/MMSCF (96 kg/m$^3$), well below the allowed upper limit of 7 lb/MMSCF (112 kg/m$^3$) required by the gas pipeline transportation standards for natural gas.

A dehydrator according to the invention may consist of a number of very narrow adjacent, parallel elongate conduits having chilled gas contact surfaces. When the equivalent hydraulic diameter or width of the elongate conduit is less than about ½ inch (about 1.3 centimeters), the Reynolds number of gas flowing in the conduit is within a turbulent flow region which ranges from about 4,000 to about 300,000 for air or natural gas. Under turbulent flow conditions, eddy diffusion is promoted to a significant degree, and thus the moisture in the gas quickly diffuses to and freezes on the chilled surfaces within a reasonably short gas flow path.

FIG. 2 is a schematic of a dehydrator 40 of the invention containing a plurality of elongate conduits 42 through 56 contained in a pressure vessel 58. The pressure vessel 58 has a gas inlet 60, a gas exit 62, a liquid drain port 64, and a series of valves for selectively feeding and selectively bypassing one or more of the conduits 42 through 56. The means for cooling the surface in contact with the gas is preferably a refrigeration device 66 which provides a coolant fluid by means of coolant exchanger 68 and may provide a heat source for regenerating the dehydrator 40 by means of waste heat exchanger 70. The refrigeration unit may be an industrial refrigeration unit whereby the waste heat discharged from the unit may be used to provide the heat source for melting the ice and hydrates on the coolant surfaces during a regeneration sequence. Other means for cooling the surface of the conduit which is in contact with the gas stream may also be used. Hence, the coolant may be any suitable gas, liquid, solid particles or a mixture of gas, liquid or solid particles which may be used to cool the surface of the conduit which is in contact with the gas stream.

The coolant used in the dehydrator 40 is supplied through coolant feed conduit 72 to multi-port coolant inlet valve 74 for feed through coolant inlets 76–88 corresponding to valve ports 76–88 of multi-port valve 74. Coolant is returned to the refrigeration unit from coolant exits 92–104 corresponding to valve ports 92–104 of multi-port coolant exit valve 108 after passing through the coolant side of elongate conduits 42 through 54. The coolant is returned to the refrigeration unit 66 through coolant return conduit 110.

During the moisture removal cycle, gas outlet valves 112 through 124 associated with elongate conduits 42–54 are open for flow of gas through the conduits. For purposes of illustration, outlet valve 126 is closed for regeneration of elongate conduit 56. During regeneration, a heated fluid is provided from waste heat exchanger 70 through heat source supply conduit 128 to multi-port heat source inlet valve 130 through the valve port 90 corresponding to heat source inlet 90. The heated fluid is returned to the heat source from outlet 106 and valve port 106 in multi-port valve 132 and is returned to exchanger 70 through heat source return conduit 134. Liquid draining from regenerated elongate conduit 56 exits the dehydrator vessel 58 though drain port 64.

The above-mentioned multi-port valves are so timed that a plurality of conduits are performing the moisture removal function while one or more other conduits are being regenerated. FIG. 2 illustrates the regeneration of only one elongate conduit at a time, however, it will be recognized that two or more elongate conduits may be regenerated either simultaneously or sequentially. The regeneration sequence timing and conduit selection sequence are within the skill of those in the art.

It is preferred to insulate the individual elongate conduits 42–56 in order to more efficiently cool the conduits during the dehydration cycle and heat the conduits during the regeneration cycle. Separate coolant and heat sources may also be provided if desired.

More or fewer elongate conduits may be used in a single pressure vessel. However, because the regeneration process is typically much faster than the moisture removal process, one section out of eight performing the regeneration function at a time is sufficient for the regeneration of the 8-section dehydrator illustrated in FIG. 2. Accordingly, the illustrated design may be used for continuous dehydration of a gas.

Figure 3A:
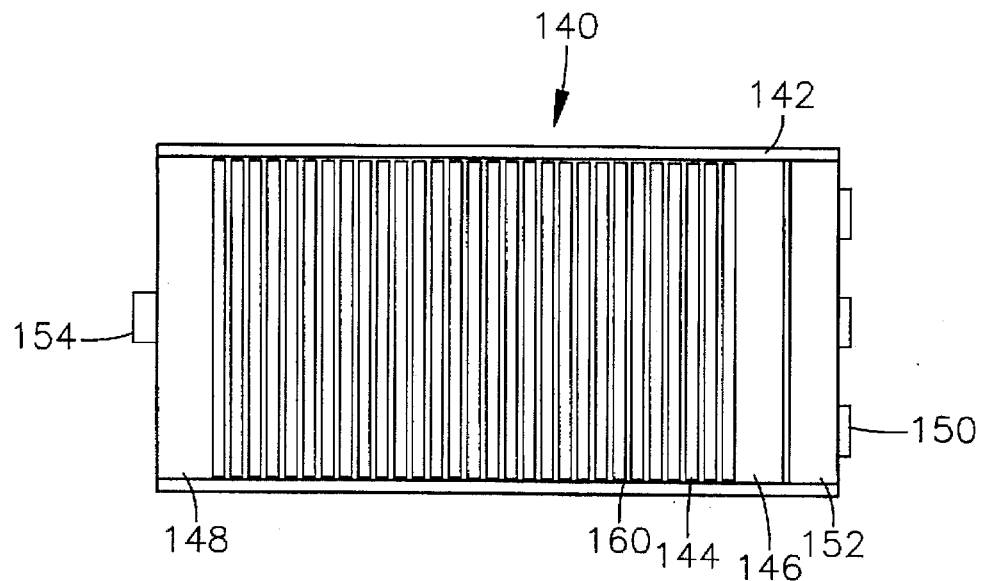
FIGS. 3A and 3B illustrate one design for a multi-channel dehydrator according to the invention.
Figure 3B:
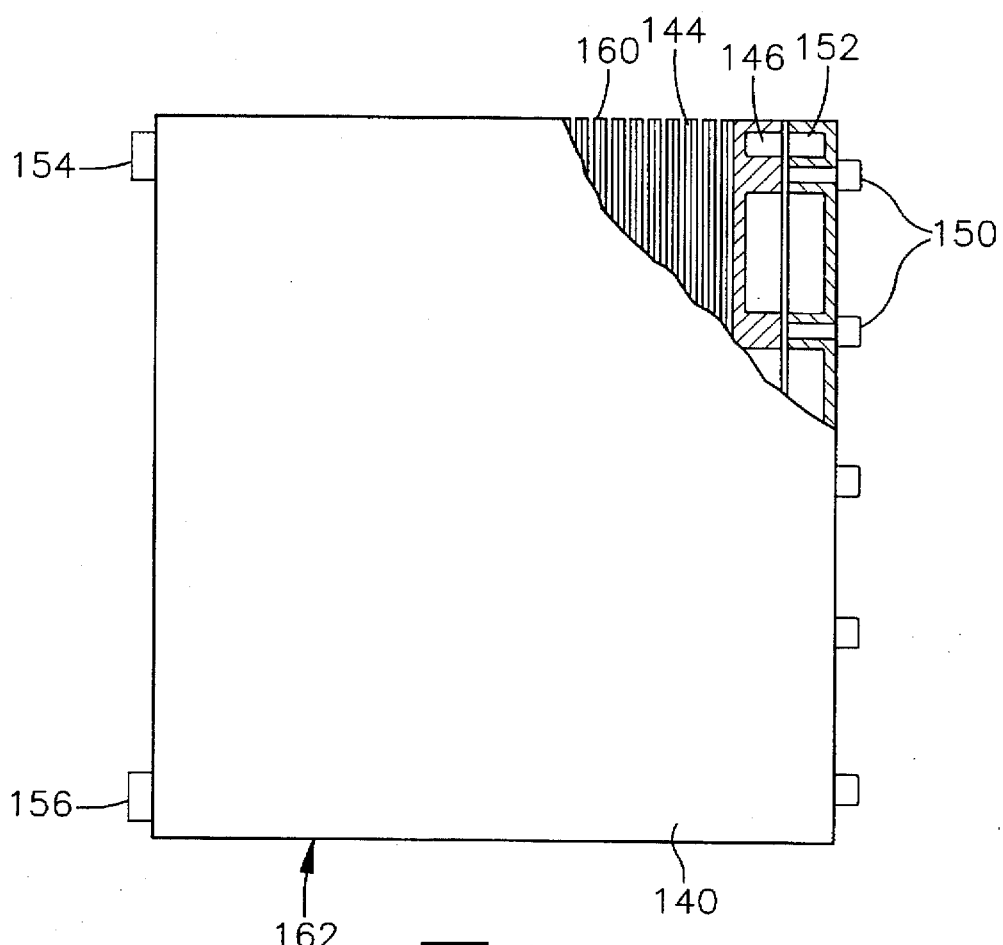

FIGS. 3A and 3B show one configuration of a dehydrator 140 of the invention consisting of thin metal plates assembled in a rigid frame 142. The dehydrator 140 consists of an assembly of a number of plate-type heat transfer elements 144 clamped tightly together between two end plates 146 and 148 with clamping bolts 150 mounted on another end plate 152. The coolant liquid or regeneration liquid enters the dehydrator 140 through inlet 154 where it flows inside the plates 144, and exits from the dehydrator through exit 156 (FIG. 3B). Gas enters the dehydrator 140 from the top 160 of the dehydrator assembly 140 wherein it flows in the elongate conduits between heat transfer elements 144 and exits the dehydrator through the bottom 162 of the dehydrator assembly 140.

FIGS. 4A through 4C are detailed illustrations of one preferred design of the heat transfer elements 144 which may be assembled in the dehydrator of FIGS. 3A and 3B. FIG. 4A is a side elevational-view of the heat transfer element 144 which is an assemblage of rigid elongate metal webs 170 and 172 which are fixedly attached to one another by a means such as seal-welding along the periphery thereof. The lower rigid elongate metal web 172 contains a plurality of interconnected grooves which form the coolant and heated fluid flow channels for cooling the gas. The upper rigid elongate metal web 170 contains a plurality of rigid spacers which separate metal web 170 from an adjacent metal web 172 and which provide the elongate flow path for the gas. The height of the spacers 176 equals the width of the elongate conduit.

The two surfaces of the elongate metal web 172 are illustrated in FIG. 4B. Metal web 170 contains a liquid inlet plenum 178 which connects channels 174 to inlet port 182 and a liquid exit plenum 180 which connects channels 174 to exit port 184 for flow of coolant fluid and heated fluid through the channels 174. The two surfaces of elongate metal web 170 are illustrated in FIG. 4C showing the rigid spacers 176, inlet port 182 and exit port 184 which transfer heating and cooling fluids from one heat transfer element 144 to an adjacent heat transfer element.

Figures 5A, 5B:
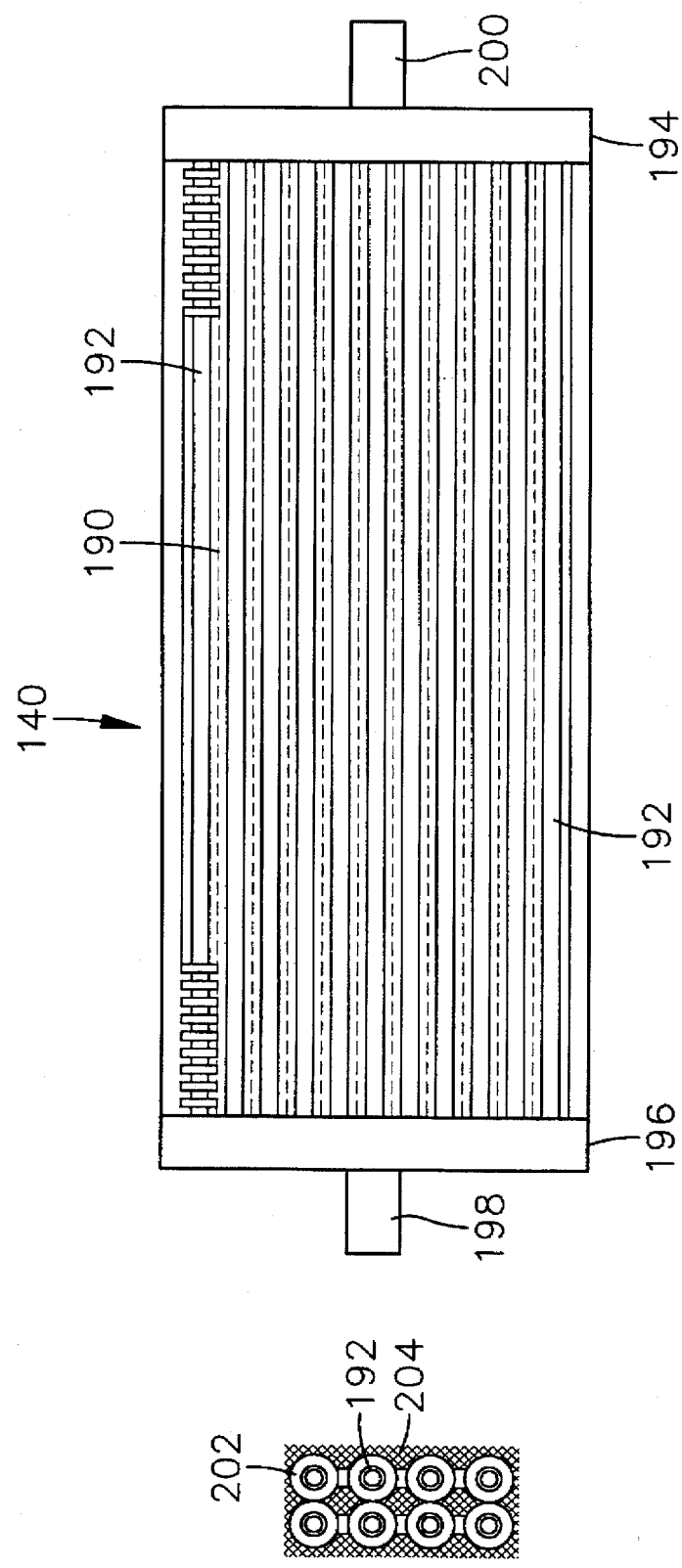
FIGS. 5A and 5B illustrate an alternative design for a multi-channel dehydrator according to the invention.

FIGS. 5A and 5B show an alternative design of a dehydrator 140 according to a preferred embodiment of the invention. In this embodiment, the gas flows through an elongate conduit 190 adjacent a plurality of finned tubes 192 which carry the coolant fluid or regeneration fluid. In one arrangement, the finned tubes 192 are connected on their inlet end to an inlet plenum 194 and on their outlet end to an outlet plenum 196 for parallel flow of the coolant fluid or regeneration fluid through the tubes. In the alternative, the tubes may be interconnected on their inlet and outlet ends for serial flow of the fluids through the tubes. The finned tubes 192 are preferably arranged in a square matrix pattern as shown in FIG. 5B. In addition to the fins 202, the gaps between the finned tubes 192 may be filled with a material 204, preferably a plastic material to provide flow channels and additional contact between the tubes 192 and the gas.

The gas to be dehydrated enters the dehydrator 140 through inlet 198 flows outside and perpendicular to the finned tubes 192 in a substantially countercurrent direction through elongate channels 190 and exits the dehydrator through outlet 200.

A schematic representation of a single-section dehydrator of the invention is illustrated in FIG. 6. The dehydrator is comprised of a pressure vessel 210 containing a closely wound helical tube bundle 212 for flow of heating and cooling fluids therethrough. Coolant fluid from refrigerant storage vessel 214 flows inside of the helical tube bundle 212 while the gas to be dehydrated flows transversely outside the helical tube bundle 212 from gas inlet conduit 216 to the gas outlet conduit 218.

A coolant fluid is pumped by pump 220 from refrigerant storage vessel 214 through supply conduit 222 to the inlet 224 of helical tube bundle 212 in pressure vessel 210. After passing through the helical tube bundle 212, the coolant fluid is returned to the refrigerant storage 214 from outlet 226 through return conduit 228.

In order to extend the period of time a gas may be dehydrated without regenerating the dehydrator, additional valves 230, 232, 234, and 236 and additional conduits 238 and 240 are provided so that the coolant may enter the helical tube bundle 212 from either the inlet 224 or the outlet 226.

Initially coolant fluid flows from refrigerant storage vessel 214 though conduit 222 and valve 230 to helical tube bundle inlet 224 during the first phase of the dehydration period. During this phase, valves 232 and 234 in conduits 238 and 240 are closed. The gas to be dehydrated flows through conduit 216 through valve 244 to inlet port 246 of pressure vessel 210 in a countercurrent direction to the coolant fluid flow in the pressure vessel 210 and exits the pressure vessel through exit port 248. Dehydrated gas then flows through valve 250 in conduit 218 to a dehydrated gas storage vessel (not shown).

During this initial operating phase of the dehydrator, moisture in gas diffuses to the cold surface of the helical tube bundle 212 and freezes into ice. Because the ice film is thicker on tube surface near inlet port 246, the gas and refrigerant flows are preferably reversed after a certain period of time in order to increase the total operating time of the dehydrator before regeneration is required. Accordingly, in the second phase of operation, valve 230 in conduit 222 and valve 236 in conduit 228 are closed and valves 232 in conduit 238 and valve 234 in conduit 240 are opened so that the coolant flows in the reverse direction through the helical tube bundle 212. Likewise, the flow of gas through the pressure vessel 210 is reversed by closing valve 250 in conduit 218 and valve 244 in conduit 216 and opening valve 252 in conduit 256 and valve 254 in conduit 258.

For the regeneration phase of operation of the dehydrator, the coolant fluid flow and gas flow are discontinued and a heated fluid is provided from heated fluid storage vessel 260 through valve 262 in conduit 222 to the helical tube bundle 212 and is returned to the storage vessel 260 through conduit 264 and valve 266. As the ice on the outside of helical tube bundle 212 melts, the liquid thus formed is drained from pressure vessel 210 through valve 268.

Additional drying of the surfaces of the helical tube bundle 212 may be achieved by closing valve 244 in conduit 216 and valve 270 in conduit 218 and providing warm air via blower 276 through conduit 278 and valve 272 to the inlet 246 of the pressure vessel. As the warm air picks up moisture from the tube bundle 212, it exits the pressure vessel 210 through exit 248 and valves 250 and 274 and is discharged to the atmosphere. By use of the foregoing design, the regeneration period is estimated to be 10–15% of the total operational time of the dehydrator.

Figure 7:
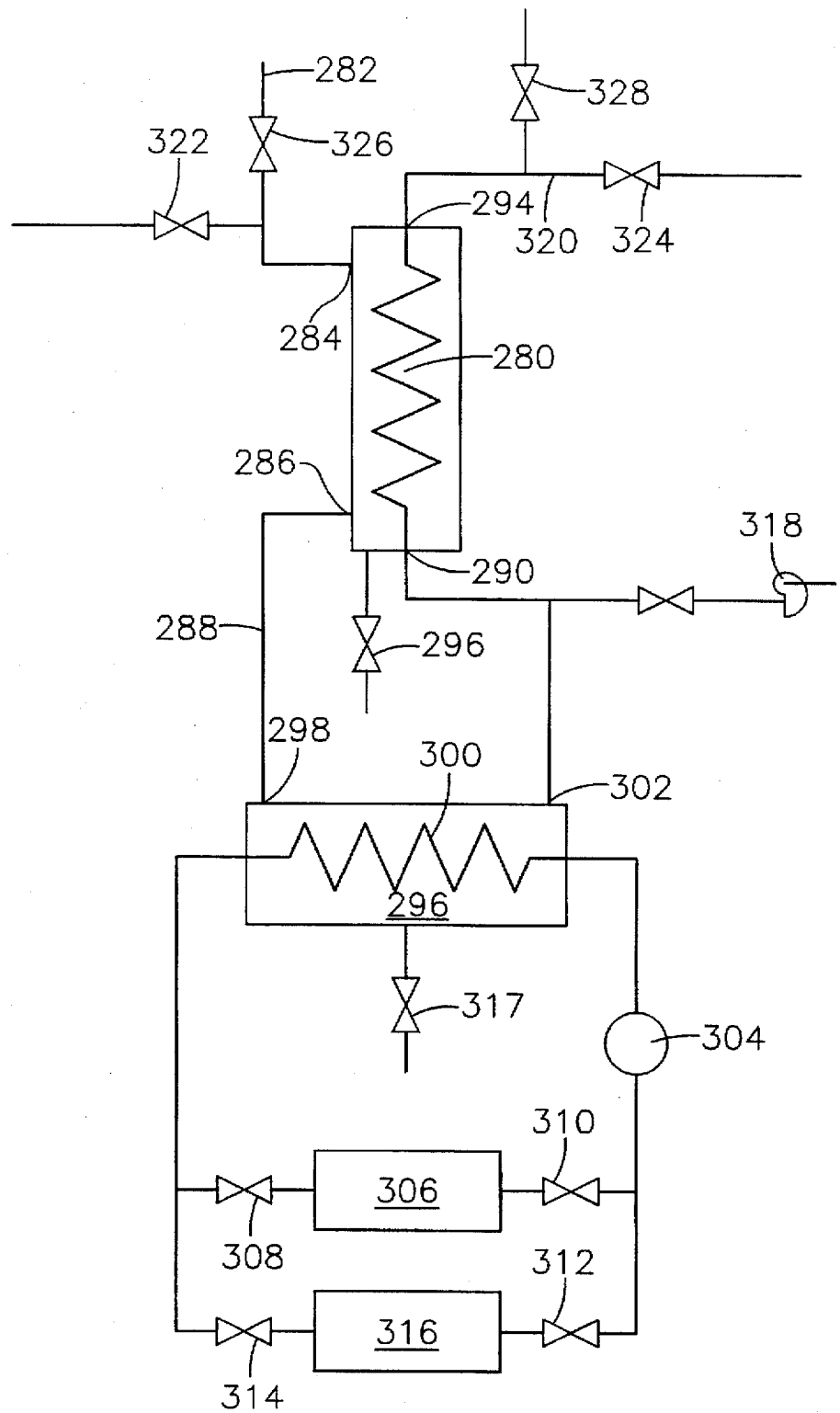
FIG. 7 is a schematic representation of a modification of the dehydrator and regeneration system illustrated in FIG. 6.

FIG. 7 is a schematic representation of a single-section dehydrator of the invention similar to the system illustrated in FIG. 6 with the addition of an a heat recuperator 280 to reduce the total energy demand of the system. In FIG. 7 the untreated gas from inlet conduit 282 flows through an elongate conduit of a recuperator 280 from the inlet 284 to the outlet 286 of the recuperator. Cooled dehydrated gas flows through the recuperator 280 in countercurrent flow direction from the cooled gas inlet 290 to the cooled gas outlet 294 of the recuperator. A portion of the moisture in the gas from conduit 282 is condensed and drained from the recuperator 280 by means of drain valve 296. Another portion of the moisture is frozen on the surfaces of the elongate conduit of the recuperator 280.

The cooled and partially dehydrated gas then enters the dehydrator 296 from inlet 298 and flows through the a closely wound helical tube bundle 300 in the dehydrator to outlet 302. Coolant fluid is pumped by means of pump 304 from a refrigerant storage vessel 306 and flows inside of the helical tube bundle 300 to further cool the partially dehydrated gas before being returned to the refrigerant storage vessel. Additional moisture removed from the gas collects on the surface of the helical tube bundle 300 as ice.

When the ice film on the surface of the helical tube bundle 300 becomes thick enough, the ice is removed in a regeneration cycle. In the cycle, coolant fluid valves 308 and 310 are closed and heated fluid valves 312 and 314 are opened so that heated fluid from a heated fluid storage vessel 316 can be pumped through the helical tube bundle 300. As the temperature of the tube bundle 300 is increased, ice melts from the surface of the tube bundle and is drained from the dehydrator by means of drain valve 316.

In order to assist in the melting and drying of the heat exchange surfaces of the recuperator 280 and dehydrator 296, a blower 318 may be used to pump warm ambient air through the recuperator coolant inlet 290 and dehydrator gas outlet 302 through conduits 288 and 320 and valves 322 and 324 while gas inlet valve 326 and gas outlet valve 328 remain closed. Additional conduits and valves may be used as in FIG. 6 so that the gas to be dehydrated and the coolant fluid may flow in either direction through the dehydrator and recuperator.

There are many other designs for effective dehydrators according to the invention including narrowly spaced spiral thin plates, flat thin plates, and finned tubes which may be used in the single-sectional dehydrator in addition to or in lieu of the closely wound helical tube bundle.

As described above, regeneration of the dehydrator is a relatively simple procedure. A hot fluid, preferably of the same composition as the coolant fluid may be circulated intermittently through the dehydrator to raise the temperature of the coolant surfaces in order to melt any ice which may have formed on the surfaces. In addition to or in the alternative, hot air may be passed over the coolant surfaces after terminating the flow of gas to be dehydrated. As the coolant surfaces are heated, deposits of ice and hydrates are melted, and the water drained from the dehydrator. Because the gas flow paths in the dehydrator are relatively narrow, the time needed for defrosting and drying the dehydrator coolant surfaces is a relatively small fraction of the total operational period. Accordingly, gas dehydration may be effected by a single-section dehydrator for low gas throughput rates in which the regeneration is conducted intermittently, or in a multi-sectional dehydrator for higher gas throughput rates in which the dehydration and regeneration steps are substantially continuous.

In the continuous dehydrator design, the heat exchange elements are comprised of substantially identical sections into which the coolant fluid and the regeneration fluid enter alternately in a predetermined sequence controlled by multi-pore valves as described above. By appropriately timing the flow of the coolant and regeneration fluids in the different sections, one section of this dehydrator may be defrosted while all the other sections are dehydrating the gas. With such a system, moisture may be continuously removed from a gas while at the same time ice and solid deposits are continuously removed from one or more sections of the dehydrator. If desired, individual dehydrators may be run in parallel for dehydrating a gas and one or more of the dehydrators may be regenerated while the others are dehydrating the gas.

A multi sectional regenerative dehydrator may be used to continuously remove moisture from a gas and, at the same time, continuously remove the solid deposits from the chilled surfaces in another section of the dehydrator. It is also feasible, if desired, to run several discrete dehydrators in parallel and to operate these devices on a predetermined sequence by a set of valve systems and a timing device to provide essentially continuous operation.

The following example of the operation of a dehydrator according to the invention is given by way of illustration and is not to be considered as a limitation of the invention.

EXAMPLE

Compressed air saturated with water vapor was passed through a dehydrator having a conduit diameter of approximately 2 inches (5 cm). The dehydrator consisted of a pair of concentric chilled tube surfaces having an annular gas flow channel between the chilled surfaces of 0.1 inch (0.25 cm). The total length of the gas flow path was 26 inches (66 cm). Dehydration of the compressed air to the desired level was achieved for gas flow rates up to 7.26 ACFM (actual cubic feet per minute). Humidity measurements on the exiting cold compressed air stream indicated that the air was unsaturated. No entrained ice or water particles were found in the filter connected to the compressed air exit conduit. The maximum flow rate of 7.26 ACFM corresponds to more than twice the actual flow rate expected from a natural gas well, i.e., 173 SCFM (standard cubic feet per minute) at 1,000 psig. In this example, an average ice deposit thickness of 0.02 inches (0.05 cm) on the chilled surfaces was obtained without any sign of blockage of the compressed air flow through the dehydrator. The accumulated ice thickness corresponds to a 40% average reduction of the flow area of the elongate conduit. Hence, the dehydrator had a very large dehydrating capability despite the fact that the length of the gas flow path for the required dehydration level was relatively short, only 26 inches (66 cm).

An advantage of the dehydrator of the present invention is that no vaporous toxic materials are emitted from the dehydrator into the environment. Any hazardous or toxic materials which may be present will remain in the liquid drained from the dehydrator where they may be readily treated. Furthermore, the dehydrator may be of compact design and its operation as described above is simple and thus relatively reliable.

Having described the invention and preferred embodiments thereof, it will be recognized that numerous variations, substitutions and additions may be made to the invention by those of ordinary skill without departing from the spirit and scope of the appended claims.

What is claimed is:

1. A gas dehydrator for removing moisture from a moisture laden gas which comprises:

an elongate conduit having an equivalent hydraulic diameter ranging from about 1/20 to about 1/2 inch (about 0.1 to about 1.3 centimeters), an entrance open end and an exit open end and a gas contact surface defining a flow path for the gas through the conduit from the entrance open end to the exit open end; and means for cooling the gas contact surface to a temperature sufficient to freeze water molecules adjacent the gas contact surface so that ice is deposited on the gas contact surface along the flow path through the conduit.

2. The dehydrator of claim 1 further comprising a plurality of conduits defining a plurality of flow paths, a bypass device for selectively bypassing one or more of the conduits with the gas, a means for heating the gas contact surface of the one or more bypassed conduits for regenerating the one or more bypassed conduits and a fluid outlet in fluid flow communication with the one or more bypassed conduits for discharge of liquid from the heated conduits.

3. The dehydrator of claim 2 wherein the means for cooling comprises a refrigeration unit.

4. The dehydrator of claim 3 wherein the refrigeration unit also provides the means for heating.

5. The dehydrator of claim 1 wherein the elongate conduit is comprised of at least two spaced apart, substantially parallel elongate metal webs defining a plurality of substantially parallel flow channels disposed between the webs.

6. The dehydrator of claim 4 wherein the distance between the spaced apart metal webs ranges from about 0.1 centimeter to about 1.0 centimeter and each of the flow channels has a width ranging from about 0.1 to about 1.0 centimeter.

7. The dehydrator of claim 1 wherein the conduit has a diameter ranging from about 0.1 centimeter to about 1.0 centimeter.

8. The dehydrator of claim 1 wherein the conduit is comprised of a closely wound helix material defining a flow path having a heat transfer capability.

9. The dehydrator of claim 8 wherein the flow path defined by the helix material has a width ranging from about 0.1 centimeter to about 1.0 centimeter.

10. The dehydrator of claim 1 further comprising at least two parallel conduits defining at least one dehydration flow path and at least one regeneration flow path, a valving system to switch the gas flow between the dehydration flow path and the regeneration flow path and a timer to control the valving system for switching between the flow paths.

11. A method for removing moisture from a gas containing water vapor comprising:

establishing a turbulent flow of the gas in an elongate conduit having an equivalent hydraulic diameter ranging from about 1/20 to about 1/2 inch (about 0.1 to about 1.3 centimeters), the conduit having an entrance open end and an exit open end for flowing the gas material from the entrance open end to the exit open end and a gas contact surface which is cooled to a temperature below the freezing point of the moisture in the gas; and removing moisture from the gas while maintaining a temperature of a substantial portion of the gas above the freezing point of the residual moisture in the gas, wherein the gas exiting the conduit from the exit end has a residual moisture level which is below the saturation point of the gas.

12. The method of claim 11 wherein there are a plurality of elongate conduits, a bypass device for selectively bypassing one or more of the conduits with the gas and a heating means for heating the one or more bypassed conduits, the method further comprising bypassing one or more of the conduits and heating the one or more bypassed conduits to a temperature sufficient to melt ice in the one or more bypassed conduits.

13. The method of claim 11 wherein the conduit is cooled by means of a refrigeration unit.

14. The method of claim 12 wherein the heating means comprises a waste heat exchanger for recovering waste heat from the refrigeration unit.

15. The method of claim 11 wherein the elongate conduit is comprised of two or more spaced apart, substantially parallel metal webs defining a plurality of substantially parallel flow channels disposed between the webs.

16. The method of claim 15 wherein the distance between the spaced apart metal webs ranges from about 0.1 centimeter to about 1.0 centimeter and each of the flow channels has a width ranging from about 0.1 to about 1.0 centimeter.

17. The method of claim 11 wherein the elongate conduit is comprised of a closely wound helix material having heat transfer capability.

18. A method for removing water vapor from natural gas comprising:

flowing the natural gas under turbulent flow conditions through an elongate conduit having an equivalent hydraulic diameter ranging from about 1/20 to about 1/2 inch (about 0.1 to about 1.3 centimeters) and a gas contact surface for contact with the gas;

cooling the gas contact surface with a means for cooling to a temperature below the freezing point of the water vapor in the gas; and discharging the natural gas from the conduit wherein the discharged natural gas is unsaturated at a temperature within the range of from about −15° to about 40° C.

19. The method claim 18 wherein the natural gas is flowing in the conduit with a Reynolds number within the range of from about 4,000 and 300,000.

20. The method of claim 18 wherein there are a plurality of elongate conduits, a bypass device for selectively bypassing one or more of the conduits with the natural gas and a heating means for heating the one or more bypassed conduits, the method further comprising bypassing one or more of the conduits and heating the one or more bypassed conduits to a temperature sufficient to melt ice in the one or more bypassed conduits.

21. The method of claim 18 wherein the means for cooling comprises a refrigeration unit.

22. The method of claim 20 wherein heating means comprises a waste heat exchanger for recovering waste heat from the refrigeration unit.

23. The method of claim 18 wherein the elongate conduit is comprised of two or more spaced apart, substantially parallel metal webs defining a plurality of substantially parallel flow channels disposed between the webs.

24. The method of claim 23 wherein the distance between the spaced apart metal webs ranges from about 0.1 centimeter to about 1.0 centimeter and each of the flow channels has a width ranging from about 0.1 to about 1.0 centimeter.

25. The method of claim 18 wherein the elongate conduit is comprised of a closely wound helix material having heat transfer capability.

26. The method of claim 18 wherein the elongate conduit is comprised of an annular flow path between concentric elongate tubes wherein the natural gas flows in the annular flow path and the refrigerant flows inside and outside of the annular flow path in a countercurrent direction to the flow of the natural gas.

27. The method of claim 18 wherein the elongate conduit is inclined from a horizontal plane and the natural gas enters the conduit from below the horizontal plane.

28. The method of claim 18 wherein the elongate conduit is vertically oriented and the natural gas enters the conduit from the bottom and exits the conduit from the top.

* * * * *

UNITED STATES PATENT AND TRADEMARK OFFICE
CERTIFICATE OF CORRECTION

PATENT NO. : 5,664,426

DATED : September 9, 1997

INVENTOR(S) : Yingzhong Lu

It is certified that error appears in the above-indentified patent and that said Letters Patent is hereby corrected as shown below:

Column 5, line 40, change $L = (V/E)(x_o \pi)^2 \ln c_o/c_L,$ to

-- $L = (V/E)(x_o/\pi)^2 \ln c_o/c_L,$ --.

Column 9, line 19, change "316" to -- 317 --.
Column 9, line 56, change "pore" to -- port --.

Signed and Sealed this

Tenth Day of February, 1998

BRUCE LEHMAN

Attest:

Attesting Officer     Commissioner of Patents and Trademarks